US007003144B2

(12) United States Patent
Yim

(10) Patent No.: US 7,003,144 B2
(45) Date of Patent: Feb. 21, 2006

(54) VESSEL DELINEATION IN MAGNETIC RESONANCE ANGIOGRAPHIC IMAGES

(75) Inventor: Peter J. Yim, Bethesda, MD (US)

(73) Assignee: The United States of America as represented by the Department of Health and Human Services, Washington, DC (US)

( * ) Notice: Subject to any disclaimer, the term of this patent is extended or adjusted under 35 U.S.C. 154(b) by 676 days.

(21) Appl. No.: 10/203,662

(22) PCT Filed: Jan. 19, 2001

(86) PCT No.: PCT/US01/01851

§ 371 (c)(1),
(2), (4) Date: Aug. 9, 2002

(87) PCT Pub. No.: WO01/59707

PCT Pub. Date: Aug. 16, 2001

(65) Prior Publication Data

US 2003/0031351 A1 Feb. 13, 2003

Related U.S. Application Data

(60) Provisional application No. 60/181,990, filed on Feb. 11, 2000.

(51) Int. Cl.
G06K 9/00 (2006.01)

(52) U.S. Cl. .................. 382/130; 424/904
(58) Field of Classification Search ........... 600/524, 600/410, 409, 407; 424/9.3, 9.4; 382/134, 382/133, 132, 131, 130, 129, 128
See application file for complete search history.

(56) References Cited

U.S. PATENT DOCUMENTS 4,771,467 A 9/1988 Catros et al.
5,175,773 A 12/1992 Garreau et al.
5,792,056 A 8/1998 Prince

FOREIGN PATENT DOCUMENTS

FR 2623642 5/1989

OTHER PUBLICATIONS

Arcelli et al., "Finding Grey-Skeletons by Iterated Pixel Removal," *Image and Vision Computing*, vol. 13, No. 3, pp. 159-167, Apr. 1995.

(Continued)

Primary Examiner—Kanjibhai Patel
Assistant Examiner—Abolfazl Tabatabai
(74) Attorney, Agent, or Firm—Flarquist Sparkman, LLP

(57) ABSTRACT

Delineating vessels in an angiogram involves two methods: graph generation and skeletonization. Generating a graph includes obtaining a digital image of an angiogram, recognizing a first growth point within the image, and identifying region boundary points around the growth point. The region boundary points are connected to the first growth point, thereby creating edges of a graph. The boundary point that has the greatest intensity is then selected as a second growth point, and additional region boundary points around the second growth point are identified. The additional region growth points are connected to the second growth point. The region boundary point with the greatest intensity in the image is then selected as a third growth point, and the method repeats until each point in the image is connected to another point in the graph. The skeletonization of the graph begins with recognizing a point in the graph as an endpoint of a vessel. This may be done explicitly through manual or automatic selection of specific points. It may also be done implicitly through a trimming process whereby graph branches of fewer than a certain number of connected points are discarded. The endpoints in the remaining branches are recognized as vessel endpoints. The skeletonization concludes with display of the delineated vessels. This may be done by superimposing the vessels in two or three dimensions over a conventional two-dimensional angiographic image such as a maximum intensity projection (MIP).

20 Claims, 10 Drawing Sheets

OTHER PUBLICATIONS

Buckley et al., "Automated Volumetric Quantification of Blood Vessels using MR Angiography," *Proceedings of RSNA*, p. 475, 1998. (abstract only).

Lei et al., "3D MR Angiographic Visualization and Artery-Vein Separation," *SPIE*, vol. 3658, pp. 58-66, Feb. 1999.

Nyström, "Skeletonization Applied to Magnetic Resonance Angiography Images," *SPIE*, vol. 3338, pp. 693-701, Feb. 1998.

Collorec et al., "Vectorial Tracking and Directed Contour Finder for Vascular Network in Digital Subtraction Angiography," *Pattern Recognition Letters*, vol. 8, pp. 353-358, 1988.

English Translation of pp. 1-9 of French Patent No. 2,623,642, May 26, 1989.

English abstract of French Patent No. 2,623,642, May 26, 1989.

Aylward et al., "Intensity Ridge and Widths for Tubular Object Segementation and Description," *Proceedings of IEEE Workshop*, Mathematical Methods in Biomedical Image Analysis, pp. 1-8, Jun. 1996.

Lorenz et al., "Multi-scale Line Segmentation with Automatic Estimation of Width, Contrast and Tangential Direction in 2D and 3D Medical Images," *Lecture Notes in Computer Science*, vol. 1205, pp. 233-242, 1997.

Sato et al., "3D Multi-scale Line Filter for Segmentation and Visualization of Curvilinear Structures in Medical Images" *Lecture Notes in Computer Science*, vol. 1205, pp. 213-222, 1997.

McInerney et al., "Medical Images Segmentation Using Topologically Adaptable Surfaces," *Proc. CVRMed '97*, Grenoble, France, pp. 1-10, Mar. 1997.

Wilson et al., "Segmentation of Cerebral Vessels and Aneurysms from MR Angiography Data," *Lecture Notes in Computer Science*, vol. 1230, pp. 423-428, 1997.

Lin et al., "Automated Local Maximum-intensity Projection with Three-dimensional Vessel Tracking," *J. Magn. Reson. Imaging*, vol. 2, pp. 519-526, 1992.

Yim et al., "Enhancement of the Magnetic Resonance Angiogram," *Annals of Biomedical Engineering*, vol. 26, p. S-4, 1998.

Ko et al., "A Fully Automated Identification of Coronary Angiograms," *Internatinal Journal of Bio-Medical Computing*, vol. 39, pp. 193-208, 1995.

VESSEL DELINEATION IN MAGNETIC RESONANCE ANGIOGRAPHIC IMAGES

This is a §371 U.S. national stage of PCT/US01/01851, filed Jan. 19, 2001, which was published in English under PCT Article 21(2), and claims the benefit of U.S. Application No. 60/181,990, filed Feb. 11, 2000.

TECHNICAL FIELD

This invention relates generally to magnetic resonance angiography (MRA). More particularly, the invention relates to processing magnetic resonance angiographic images, or angiograms, to delineate certain vessels in an angiogram.

BACKGROUND

Magnetic resonance angiography (MRA) is the magnetic resonance imaging of the blood vessels in the body. In MRA, special pulse sequences are used by an MR scanner to cause flowing blood to appear very bright and stationary tissue to appear very dark. If arterial structures are being studied, additional pulses are applied to erase the signal in veins. Multiple thin slices are obtained at adjacent levels through the region of interest. In prior techniques, a computer then stacks these images and creates a three-dimensional image. The constructed image can be rotated 360 degrees so that the vessels can be studied in all projections.

MRA has become a primary method for the evaluation of vascular pathologies and increasingly for the purposes of surgical planning. Rapidly improving data acquisition methods have greatly improved image quality. Much less attention, however, has been focused on post-processing techniques for enhancing what is captured in the image. One such method, the maximum intensity projection (MIP), has become the standard for vascular visualization. Because of its simplicity and non-parametric basis as well as its high visual quality, the MIP is generally advocated when the angiogram is of high quality. However, limitations in image quality in MRA persist when it has been applied to more challenging conditions such as in the abdomen, extremities, the heart, and where the vascular tree is highly overlapped such as in the cerebral MRA. The limited image quality affects the accuracy of analysis of vessel shape for diagnosis of vascular disease and the accuracy of determination of vessel paths for surgical planning.

Specifically, there are several difficulties inherent in image analysis of the vasculature. One is the lack of definition in the vascular structure; within any finite resolution image, the distal extent of the vascular tree is indeterminate. Thus, the number and extent of detected vessels is dependent on acquisition and analysis methods. Another difficulty is that, even in moderately large vessels (by axial dimension), the vessel diameter will tend to be small relative to the image resolution. A third difficulty is that vascular shape and anatomy is generally quite complex and variable.

An objective of the invention, therefore, is to provide a method for delineating vessels in angiograms. Another objective of the invention is to provide such a method that works with vascular images of the type normally obtained from a magnetic resonance angiogram.

SUMMARY

Delineating vessels in an angiogram in accordance with the invention involves two methods: graph generation and skeletonization.

Generating a graph includes obtaining a digital image of an angiogram, recognizing a first growth point within the image, and identifying region boundary points around the growth point. The region boundary points are connected to the first growth point, thereby creating a region of a graph. The boundary point that has the greatest intensity is then selected as a second growth point, and additional region boundary points around the second growth point are identified. The additional region growth points are connected to the second growth point. The region boundary point with the greatest intensity in the image is then selected as a third growth point, and the method repeats. In one aspect of the invention, the method is repeated until each point in the image is connected to another point in the graph.

The skeletonization of the graph begins with recognizing a point in the graph as an endpoint of a vessel. This may be done explicitly through manual or automatic selection of specific points. It may also be done implicitly through a trimming process whereby graph branches of fewer than a certain number of connected points are discarded. The endpoints in the remaining branches are recognized as vessel endpoints.

In one aspect of the invention, the method of graph generation may be modified to handle circumstances where vessels overlap. In this case new region boundary points around the second and subsequent growth points are identified, wherein the new region boundary points are additional region boundary points or present region boundary points whose distance within the graph from the present growth point is at least a certain number of points. This introduces cycles into the graph. The skeletonization method is also modified, so that these cycles are identified and then broken before the endpoints in the remaining branches are recognized as vessel endpoints.

The skeletonization concludes with display of the delineated vessels. This may be done by superimposing the vessels in two or three dimensions over a conventional two-dimensional angiographic image such as a MIP. With the delineation provided by this method, a view of the image can better detect the location and extent of vessels of interest.

Although the method has been developed initially for use in magnetic resonance angiography, it is applicable to digital images produced by other techniques, such as images generated with computed tomography angiography or x-ray angiography.

BRIEF DESCRIPTION OF THE DRAWINGS

FIG. 4 illustrates an alternative method for delineating vessels.

DETAILED DESCRIPTION

Figure 1:
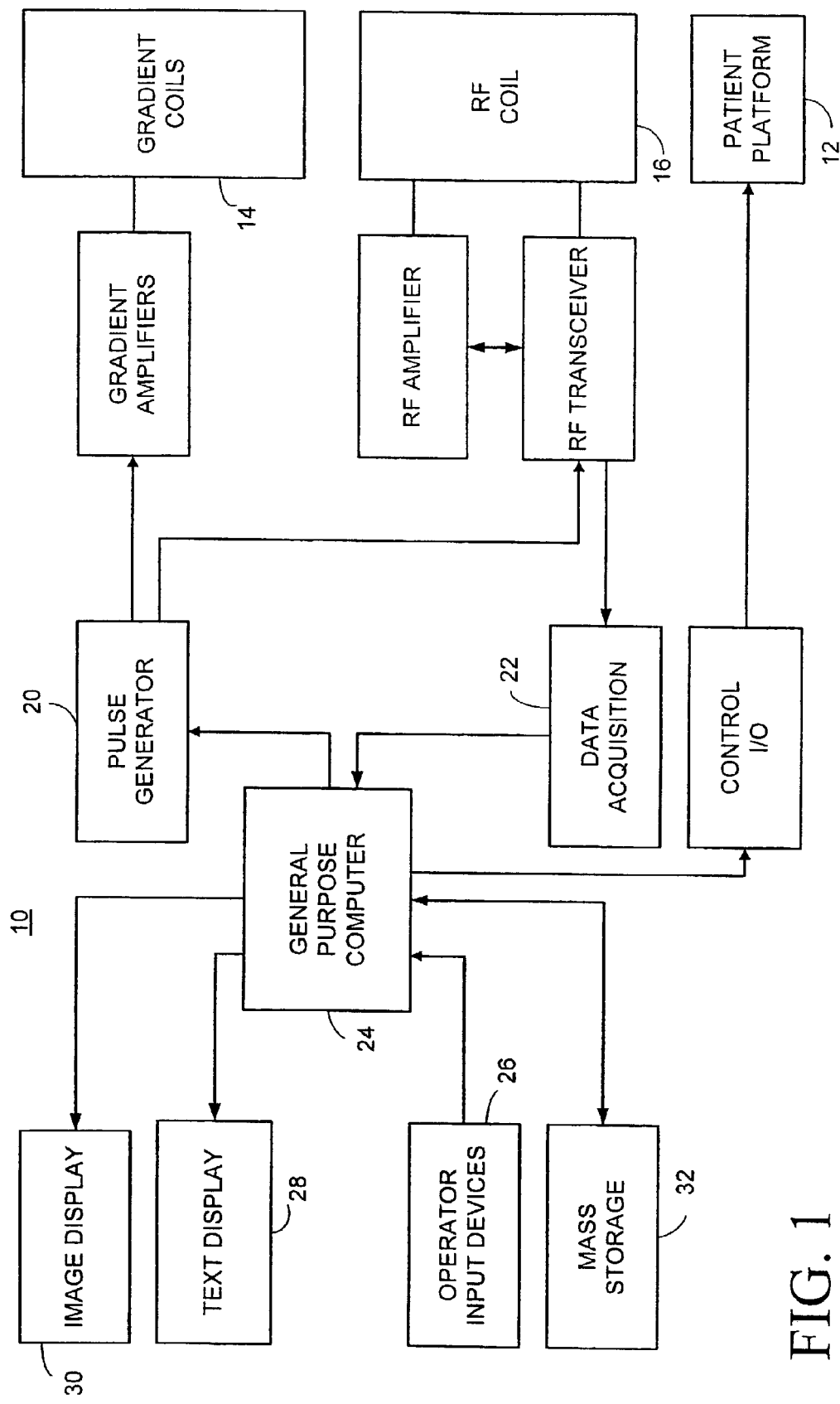
FIG. 1 is a block diagram of a typical MRI scanner with which the invention can be used.

FIG. 1 is a block diagram of a typical MRI scanner 10. MRI scanners use the technique of nuclear magnetic resonance (NMR) to induce and detect a very weak radio frequency (RF) signal that is a manifestation of nuclear magnetism. The term "nuclear magnetism" refers to weak magnetic properties that are exhibited by some materials as a consequence of the nuclear spin associated with their atomic nuclei. In particular the proton, which is the nucleus of the hydrogen atom, possesses a nonzero nuclear spin and is an excellent source of NMR signals. The human body contains enormous numbers of hydrogen atoms—especially in water and lipid molecules. Although biologically significant NMR signals can be obtained from other chemical elements in the body, such as phosphorous and sodium, the great majority of NMR studies are based on signals originating from protons that are present in the lipid and water molecules within the patient's body.

The patient to be imaged is placed on a platform 12 and subjected to several magnetic fields simultaneously or sequentially applied to elicit the desired NMR signal. The scanner 10 utilizes a strong static magnetic field in conjunction with gradient coils 14 and one or more RF coils 16. The gradients and radio frequency components are switched on and off in a precisely timed pattern, or pulse sequence, by a pulse generator 18. Different pulse sequences are used to extract different types of data from the patient. The NMR signal generated in response to the coils is captured by a RF transceiver 20 and converted to digital form by a data acquisition component 22. The scanner 10 is under the control of a general-purpose computer 24. Operator commands are given through an input device 26 such as a keyboard. The data acquired may be displayed as text and/or images on appropriate displays 28, 30, depending on the sophistication of the computer's software. Mass storage 32 provides the computer 24 with software for generating and processing images from acquired patient data and provides storage for that data.

The present invention is useful for processing magnetic resonance angiographic images, or angiograms, generated by MRI scanners such as the scanner 10. This processing delineates vessels otherwise not clearly visible to a viewer in an angiogram. In accordance with the invention, this processing can occur in real time, as the image is being generated by the scanner, or it can occur later, using an electronic copy of the image. The invention can be embodied in software that performs algorithms in accordance with the invention. This software can be stored in mass storage 32 and loaded into the computer 24 or it can be stored and used on another computer that has access to an electronic copy of the angiogram.

It should be understood that the embodiment described herein is just one example of how the invention can be used. It is not limited to enhancing MRA images. It may also be used for delineating vessels in any type of image, including but not limited to images of the vasculature obtained from computed tomography angiography or x-ray angiography.

Background

Segmentation and Vessel Tracking Methods

There are two contrasting computational approaches to the problem of detection and characterization of vascular shape in MRA. The first is that of segmentation or surface reconstruction which seeks to determine the boundary between the interior and exterior of the vessels. This determination is inherently problematic because there are no definitive distal endpoints of the vessels within the resolution of the images. Rather, the intensity of the vessels gradually diminishes as they become smaller due to the partial volume effect. Thus, intensity-based methods of segmentation will always systematically underestimate the distal extent of the vessels and the size of the more distal vessels. Another problem for direct segmentation, particularly of the smaller vessels, is that points within the vessels are not interconnected to the extent that they are in more convex structures; relatively small imperfections in the image may result in relatively large discontinuities in the vascular region. Thus, region-based strategies for segmentation or surface reconstruction of the vasculature will also tend to fail in the smaller vessels.

An alternate approach to detection/characterization of vascular structure in MRA focuses on the elongated nature of the vessels which allows them to be represented by a line or series of lines which follow the centers of the vessels. These lines are useful as a framework for anatomical analysis of the vasculature and the identification of anatomic variants. Moreover, they may provide the basis for measurements of vessel diameter which is clinically relevant to the diagnosis of atherosclerosis. In addition to these useful properties, the underlying elongated, tubular structure of the vasculature has been found to be useful a priori information for the detection of vessels. In several detection methods, the image intensity is assumed to be relatively constant along the central axis and to fall off sharply in two orthogonal directions, at least for a given "scale" or degree of blurring of the image which is quite plausible. Points which satisfy this criterion can be determined as well as paths along the centers of vessels. Several related methods use $2^{nd}$ order partial derivatives to determine vessel directionality in an analytic manner. Such methods provide both the path of the vessel and a measure of vessel diameter. However, the degree of user interaction can be quite high, presumably due to problems at bifurcations where no single direction of the vessel can be identified.

Skeletonization

Skeletonization methods address the question of the location of the central axes as well as the underlying topology of the object. In such skeletonization methods, which are typically applied to binary-valued or pre-segmented images for purposes such as optical character recognition, the skeleton representation is intended to identify key features of the object in the image as well as the interconnectedness of those features. To assure such relevance in the skeletonization, topological constraints are typically an essential feature of the skeletonization processes. For example, in the skeletal representation of a solid object no loops or holes should exist. One such skeletonization method is the Skeleton by Influence Zones (SKIZ) which is applied to binary-valued images for reducing thick boundaries between various zones to a single-pixel width. In this case, the topology of the object in the image is assumed to be purely web-like (in two dimensions) with no discontinuous branches. Other skeletonizations allow for branches with varying degrees of sensitivity. In addition, some methods have been developed for three-dimensional skeletonization which encompass the more complex three-dimensional topologies. One such method has been specifically applied to skeletonization of the MRA.

Such skeletonization methods are quite dependent on the segmentation of the image and will suffer from any inadequacies in the segmentation process. The methods of the invention seek to integrate, to some extent, gray-scale detection methods with topology constraints for purposes of both vessel detection and characterization. The underlying principle for such a gray-scale skeletonization is ordered region growing (ORG) connectivity.

Ordered Region Growing Connectivity

An ordered region growing (ORG) connectivity algorithm in accordance with the invention permits gray-scale skeletonization of multi-dimensional images. Like Dijkstra's Shortest Path algorithm and minimum spanning tree algorithms, the ORG algorithm establishes a directed acyclic graph representation of the image. As such, unique "optimal" paths are established from a seed point to all other points in the image based on gray-scale intensities. In the application of Dijkstra's algorithm to the determination of paths through images, for example, the "cost" of a particular path might be either the cumulative image intensity or the cumulative inverse image intensity (depending on whether, respectively, an intensity valley or ridge is preferred) and the shortest path is that which has the lowest cost associated with it. The ORG algorithm, however, is not based on a cumulative cost and has distinct advantages over such path detection methods. One important advantage is that, except for the directionality of the ORG graph, the graph is largely independent of the seed point location. A second advantage is that the ORG method has no bias towards spatially shorter paths. Thus, for example, the path determined by a cumulative-cost algorithm along a curved vessel will be biased towards the side of the vessel at the inside of any given curve or the side with the smaller radius of curvature. In contrast, the path determined by the ORG method will be centered in the vessel. In terms of an overall tree structure representing the vasculature, cumulative-cost methods tend to form those trees with relatively uniform branch lengths, suppressing the formation of lengthy branches. The ORG method, on the other hand, more truly represents the length of each branch.

The ORG algorithm is defined as follows. For an N-dimensional image $I: Z^N \rightarrow R$, let $R_n$ represent the voxels that define the region at iteration n. Let $B_n$ represent the boundary of $R_n$ at iteration n and $B_n \subseteq R_n$. $R_0$ may be any point or points in the image which will be referred to as seed points. $B_0$ is the boundary of that region. $G_n$ is then the set of growth points at the $n^{th}$ iteration. Where: Neighbor refers to the set of immediate neighbors of a single point, either eight- or 26-neighbor for the three-dimensional case, (26-neighbor is used in this example), and Max refers to the single point of maximum intensity of a set of points:

$$s_n = \text{Max}(B_n) = \{x \in B_n | \forall y \in B_n, I(x) \geq I(y)\} \quad (1a)$$

$$G_n = \text{Neighbor}(s_n) \backslash R_n \quad (1b)$$

$$B_{n+1} = (B_n \cup G_n) \backslash s_n \quad (1c)$$

Certain advantages may be gained by the selection of meaningful seed points such as those at the origin of a vascular tree of interest so as to establish the correct directionality of the skeleton although the connectivity, described below, is largely independent of the seed-point placement with small-scale variability occurring mainly in the vicinity of bifurcations.

The connectivity structure can be described in the terminology of graph theory. Connections, in that context. are the graph "edges." Because each point is the offspring of a single other point, the connectivity can be described as a map in terms of the set of all pairs of connected points, C.

$$E_{n+1} = E_n \cup \{s_n - g_n | g_n \in G_n\} \quad (2)$$

And the directionality, which may be meaningful by itself, can be expressed as a mapping from a given point to its parent $P: Z^N \rightarrow Z^N$ $$P(g_n) = \{s_n | g_n \in G_n\} \quad (3)$$

As note above, this connectivity structure, or graph, is tree-like such that one and only one path exists between any two points in the image. This structure can also be characterized as acyclic or without loops.

This connectivity structure can be interpreted as a set of paths between pairs of points in the region overgrown by the ORG region and these paths themselves are optimal according to the "greatest minima" criteria with only small-scale discrepancies at bifurcations. According to this criteria, the path within the ORG region has a point of minimum intensity which is greater than or equal to that of any alternative path through the image. In a sense then, the paths between any two points in the image produced by the ORG algorithm are the most "continuous" relative to alternative paths. Under conditions where the intensity of the vessels tends to peak towards the center of the vessels, which is often the case in MRA due to partial volume effects and reduced flow rates at the edges of the vessels, the ORG method will form paths closely aligned with the central axis of the vessels.

Implementation of the ORG algorithm is straightforward. The primary computational cost is due to determining the maximum point on the boundary of the growing region, $s_n$, which could, in principle, require re-scanning of a large portion of the image at each growth iteration. Thus, such a direct implementation could approach $N^2$ operations, for an image with N points. Such a computation would not be feasible for many images including 3D medical images where $N > 10^7$. However, provided a finite number of gray-scale intensities are allowed, finding the maximum can be carried out by a radix sorting process which requires on the order of $N * \log_2(M)$ operations (M is the number of discrete gray-scale intensities). The portion of the ORG for storing and retrieving boundary points using a sorting mechanism is shown below. For storing a given boundary point, the intensity of the point is INTENSITY. The number of points stored below a given subdivsion $L_{n,m}$ is given by the variable OCCUPANCY. A pointer to the top of each of the M stacks is TOP and a pointer from each of the points in the stack to the next lower point in the stack is LINK. A pointer to the point to be stored is NEW and a pointer to the point of maximum intensity in the M stacks (and therefore in the ORG boundary) is MAXPOINT.

Set Intensity($L_{n,m}$)=$m^{M-n}$ and set OCCUPANCY for all $L_{n,m}$ to 0

Storage of a new boundary point, NEW:
Initialize n, m=0
While (m<M) {
OCCPANCY($L_{n,m}$)=OCCUPANCY($L_{n,m}$)+1
Is INTENSITY≧Intensity($L_{n+1, m+1}$)?
If so, m=m+1
if no, m=m
n=n+1}
LINK(NEW)=TOP($L_{n,m}$)
TOP($L_{n,m}$)=NEW
Retrieval of the point of maximum intensity on the boundary, MAXPOINT Initialize n,m=0
If (OCCUPANCY($L_{0,0}$)>0) {
While (m<M) {
OCCUPANCY($L_{n,m}$)=OCCPANCY($L_{n,m}$)−1
Is OCCUPANCY($L_{n+1,m+1}$)>0?
If so, m=m+1
If no, m=m
n=n+1}
MAXPOINT=TOP($L_{n,m}$)
TOP($L_{n,m}$)=LINK(TOP($L_{n,m}$))}

Figure 2A:
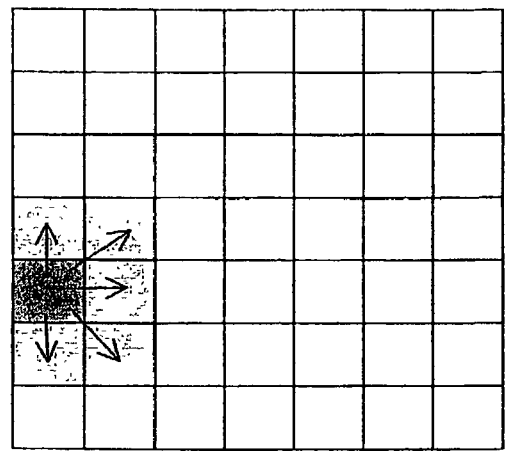
FIGS. 2A–C illustrate a basic ORG method in accordance with the invention for generating a graph representation of a low-resolution digital image and a method.
Figure 2B:
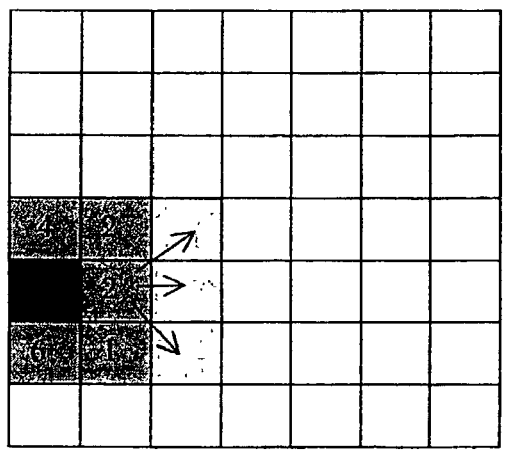
Figure 2C:
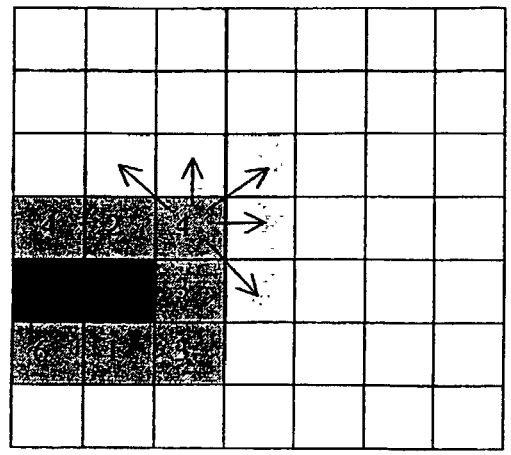

ORG skeletal lines from $p_1$ to $p_2$ with respect to a given origin, $s_o$ of the ORG is denoted $S_{ORG,so}(p_1, p_2)$ and is simply the set of connected points connected by the ORG graph from $p_1$ to $p_2$. Formally, the skeletal path $S_{ORG,so}(p_1, p_2)$ is such that:

$\exists (x_1, x_2, x_3, \ldots, x_n)$ where $x_i \in S_{ORG,so}(p_1, p_2)$,
$x_1=p_1$, $x_n=p_2$ and
$\forall i \in (1, n)$, $(x_{i-1}, x_i) \in E_{final}$, $(x_i, x_{i+1}) \in E_{final}$, FIGS. 2A–C illustrate the basic ORG method more conceptually. The region of the graph in FIG. 2A begins growing at a growth point, $s_n$ (at origin of arrows) in the angiographic image and spreads outwards to neighboring pixels or $G_n$ (known as region boundary points and indicated as light gray boxes). The growth point at each iteration (FIGS. 2B and C) is the point of maximum image intensity amongst all region boundary points, $B_n$ (dark gray boxes). The pattern of growth is recorded as a set of edges, $E_n$, which is the accumulated set of arrows from each iteration. The numbers in the boxes indicate the image intensities. Points in the grown region not on the boundary are indicated by the black boxes.

Figure 2D:
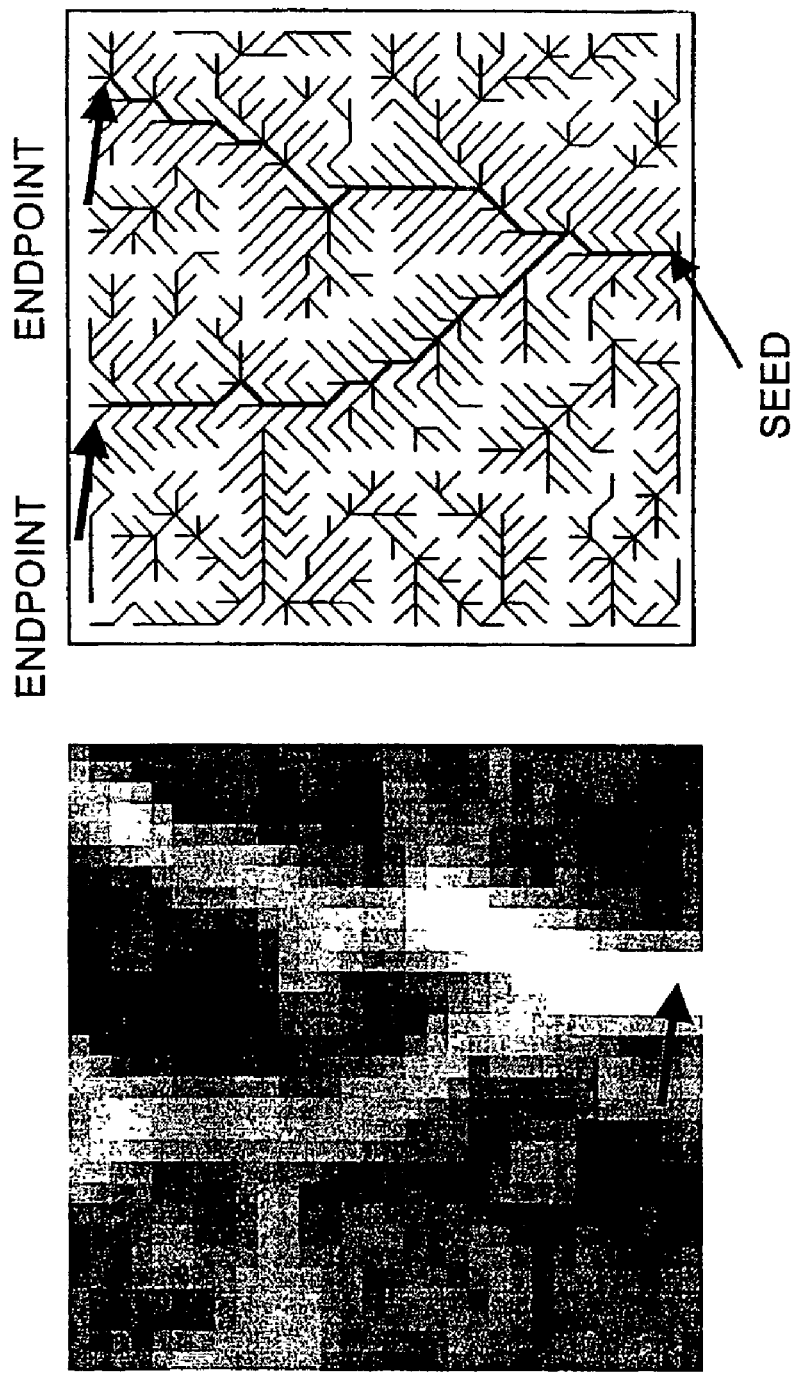

FIG. 2D shows the ORG method applied to a low-resolution two-dimensional digital angiographic image at the left, originating at the point indicated by the arrow. The ORG acyclic graph is shown at right (the directionality of the graph is not shown). The paths connecting each point are optimal. A significant path is determined from this connectivity structure and the indication of additional points (arrows on right). In this way, centerlines of the vessels in the MRA can be detected by the indication of a single seed point at the proximal end of a vascular tree and points at the distal ends of all terminal vessel segments.

In summary, generating the above graphic representation of an angiogram includes obtaining a digital image of the angiogram, recognizing a first growth point within the image, and identifying region boundary points around the growth point. The region boundary points are connected to the first growth point, thereby creating a region of a graph. The boundary point that has the greatest intensity is then selected as a second growth point, and additional region boundary points around the second growth point are identified. The additional region growth points are connected to the second growth point. The region boundary point with the greatest intensity in the image is then selected as a third growth point, and the method repeats. The method is repeated until each point in the image is connected to another point in the graph.

Skeletonization by Explicit Selection

The Algorithm

The most straightforward application of the ORG method is the skeletonization of a given vessel path based on the specification of two endpoints. This explicit selection can be done manually or done automatically. in accordance with given criteria. The graph at the right of FIG. 2D illustrates the skeletonization method applied to an ORG graph, with a seed point at the bottom and two selected endpoints at the top. In general, for a given MRA, there will be one or more vessel trees of interest in which it is desirable to determine the paths and the branching pattern. Construction of the vessel tree from vessel paths is relatively straightforward because it requires the assembly of paths from the seed point(s) to all given downstream or distal points identified by the operator.

Conceptually and in implementation it is simplest to specify a meaningful seed point or points to initialize the ORG method. The seed point is generally chosen at the origins of the vessels of interest. If the ORG path from a given distal point to a seed point is valid, it will have a uniform upstream directionality. Algorithmically, to determine such a path, the chain of connectivities is simply followed in an upstream direction through connected points (which have associated connectivity information) until a seed point is encountered. Such paths can be determined in real-time and thus the interaction can be done on a trial-and-error basis and failures of the algorithm or in point selection can be undone and potentially corrected. Such failures are visually obvious appearing as non-anatomic chaotic paths.

Symbolically, for all points i within an image I, a skeleton, S, can then be defined as all those points from which the set of user-defined peripheral points, PP, are descended as well as those peripheral points themselves with the connectivity of these points determined by the ORG algorithm. The set, Descendents (i), for a given point i represents all points which can be traced upstream though that given point, or, more formally, the descendents are all the points which would be disconnected from the rest of the connectivity graph if that point and its associated connections were removed. Given that a Path (a, b) is the set of points within the image which are traversed within the ORG connectivity graph going from a to b, including a and b, the Descendents could also be expressed as:

$$\text{Descendents}(i) = \{d \in I | i \in \text{Path}(d, P(i)), d \neq i\} \quad (4)$$

Then:

$$S = \{i \in I | \text{Descendents}(i) \cap PP \neq \emptyset\} \cup PP \quad (5)$$

Determination of such a skeletal path, given the connectivity P, is simple and entails only the retracing of the links of P backward until reaching the origin of the ORG path.

Moreover, it is possible to establish multiple branching trees within the images by simply supplying multiple seed points to the ORG algorithm. Thus, there is a mechanism to compensate for cases, for example, where regions of a vascular tree are disjoined or are only joined through overly large vessels such as the aorta where the ORG connectivity is poorly defined. For example, different seed points are needed for skeletonizing the superior mesenteric artery and the hepatic artery although they are connected through the aorta.

An Application

Angiography is essential for preoperative planning prior to hepatic perfusion for tumor therapy and prior to liver transplantation. While digital subtraction angiography (DSA) has traditionally been used for such purposes, MRA is becoming an increasingly viable and less invasive approach. An example of the use of an abdominal MRA and the potential improvement offered by skeletonization is discussed below.

Hepatic MRA is acquired with gadolinium enhancement from intravenous bolus injection with the three-dimensional spoiled gradient echo, time of flight sequence. Skeletonization endpoints were chosen interactively within the liver from inspection of MIP images of limited slice ranges where the presence and location of vessels was quite clear. In this case only the most obvious vessels were selected. Then, seed points were selected at central locations in the circulation from amongst which only one will be associated with any given endpoint.

Figure 3A:
FIG. 3 shows a method for delineating vessels within an angiogram using a graph constructed in accordance with the basic ORG method.
Figure 3A:
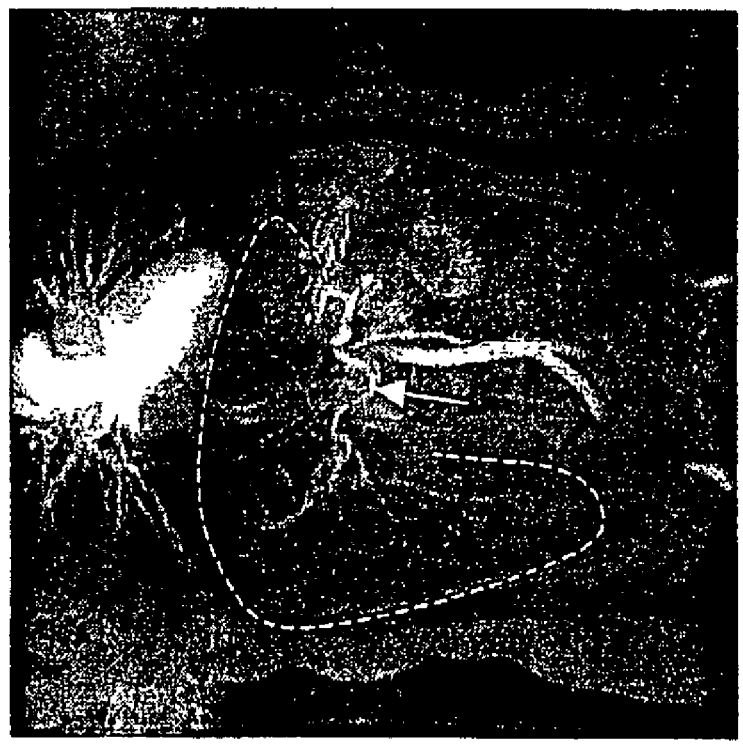

FIG. 3A shows on the left a maximum intensity projection (MIP) image of the anatomy of hepatic circulation (hepatic artery indicated with arrow, approximate boundary of liver highlighted with dotted line. The image on the right shows the skeletonization produced by explicit specification of endpoints superimposed on the MIP showing the paths of the smaller vessels with greater clarity. In this example, all distal endpoints of the vessels are identified by the user while the corresponding skeletal paths are determined and displayed in real-time. These endpoints may be identified either in individual slices or in MIP views. Determination of the ORG connectivity of a 512×512×57 image requires several minutes on a Pentium II 500 MHz processor but once computed, paths from each endpoint back to a seed point are determined and superimposed on the MIP in real-time.

Figure 3B:

FIG. 3B shows an alternative display, a three-dimensional display of the hepatic artery generated in accordance with the invention is superimposed on the anatomy of hepatic circulation.

Skeletonization by Trimming

The Algorithm

Figure 4A:
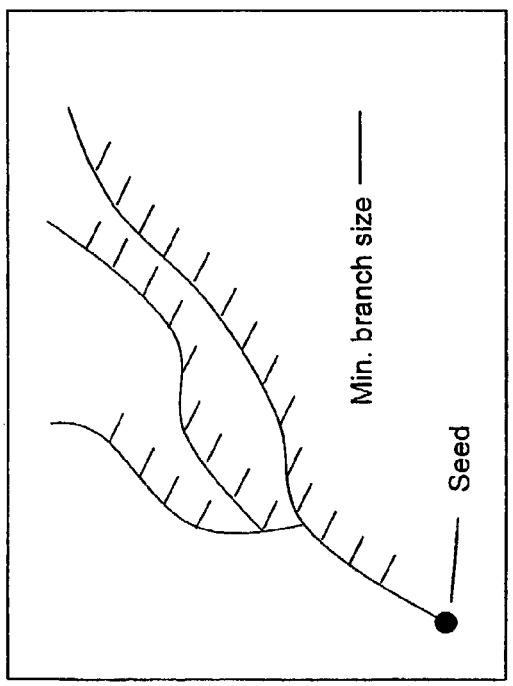
FIGS. 4A–B shows delineated vessels within several angiograms in accordance with the delineating method.
Figure 4B:
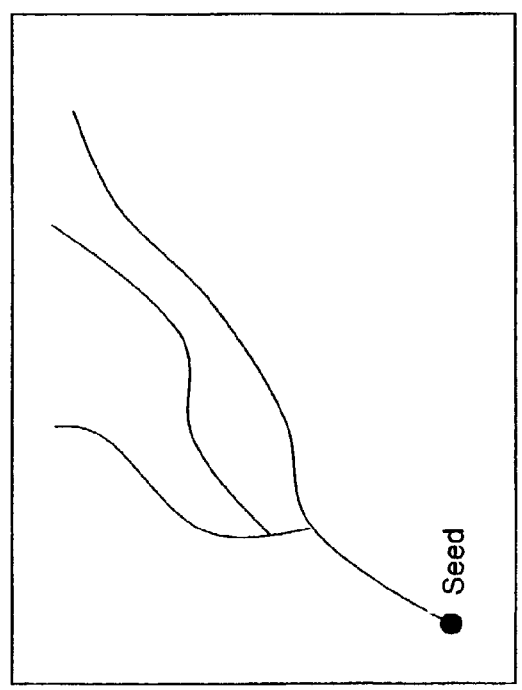

A second method of skeletonization requires only a single seed point on a given vascular tree to be provided. In this method, the skeleton is formed by a trimming process whereby the central axes of the vessels are discriminated from trivial branches according to branch length (defined in terms of number of connected points). The method is illustrated schematically in FIGS. 4A and B. FIG. 4A shows the ORG graph before trimming and FIG. 4B show the graph after trimming. At any branch point in the graph, all branches less than some minimum length are discarded, except for the branch with the greatest downstream length. With this skeletonization method, all significant vessels are delineated without the need to specify vessel endpoints. All that is requires is the specification of minimum branch length.

This criterion can be defined fairly concisely with set notation and as an algorithm. Let R be the region overgrown by the ORG in which all points in the region are greater than some given threshold value, as in a conventional intensity-based region growing. Let Siblings(i) be the set of all points with a common ORG parent:

Sibling($i$)={$j \epsilon R | P(j)=P(i)$}  (6)

Let L be the connectivity distance from a given point i to its furthest descendent within the limited ORG, or, effectively, the branch length:

Where the connectivity distance, D: $Z^N \times Z^N \to Z$, is just the number of connections between any two points within the connectivity graph. (This definition can also apply to two given edges in the graph.)

L($i$): $Z^N \to Z$ defined as

L($i$)=Maximum({$D(d, i) | d \epsilon$Descendents($i$)})  (7)

MIN be the minimum branch length which qualifies for a bifurcation; one parameter of the skeletonization. Then S is the set of points constituting the trimmed skeleton:

T={$i \epsilon R | L(i)$<MIN−1}∩{$i \epsilon R \exists k \epsilon$Siblings($i$),
  L($i$)<L($k$) }  (8a)

D={Descendents($t$)|$t \epsilon T$}∪T  (8b)

S=R\D  (8c)

An algorithm for producing such a skeletonization is given in Table 1:

TABLE 1

1. Compute ORG connectivity of given region R from seed point
2. Initialize branch lengths L(i) of all points to 0
3. Until reach steady state (no further changes in values of L for any point):
    for all i in R if L(i) > L(P(i)) − 1 then L(P(i)) = L(i) + 1
4. Initialize all points in a "skeleton" image, Skeleton, to 1
5. For all i in R:
    for all j siblings of point i
    if L(i) < L(j) and L(i) < Min
    then Skeleton(i) = 0
6. Until reach a steady state (no further changes in any Skeleton)
    for all i in R
    if (Skeleton(Parent(i)) = 0)
    Skeleton(i) = 0

In addition to using the topology of the ORG for the purposes of "trimming" as just described, the topology can also be used to guide the growth of the ORG itself. Specifically, the ORG growth which until now has been assumed to be limited by some minimum threshold value, can be limited by a given number of significant bifurcations which has more objective meaning in MRA than any absolute image intensity value. This can be done during the ORG graph growth by checking, at each growth iteration, if the growth has resulted in any new points qualifying as bifurcations.

The application of the method described above is limited mainly to cases where pure threshold-based region growing would produce reasonable results; large "leakage" in the region growing would likely correspond to false branches in the ORG skeletonization. Such conditions have been found in some cerebral MRA's and the results of the application there will be discussed in detail below.

Figure 5:
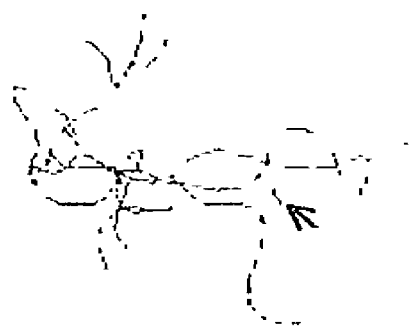
FIG. 5 shows the enhancement of an angiogram in accordance with the alternative method.
Figure 5:

FIG. 5 shows how a region of the cerebral vasculature (middle cerebral artery tree) was skeletonized by the trimming process. The MIP of the original region image is shown at left and two-dimensional projection of the skeletonization is shown at right. Bifurcation points are indicated as the darker points in the projection. Direction of flow of the vessels, not shown in this visualization, is also obtained from the skeletonization process. This skeletonization requires only the identification of a single seed point at a proximal location on the vascular tree, the nulling of the vessel in the upstream direction, and the specification of the desired number of bifurcations and minimum branch length. In this particular example, only one connectivity error was found in this result as indicated by the arrow.

Application to Circle of Willis MRA

Perhaps the site most suitable for a vascular skeletonization method is in Circle of Willis (COW) MRA. COW images were acquired with a standard Spoiled Gradient Recalled Echo (SPGR), three-dimensional time-of-flight sequence. Skeletonization by trimming was applied to the gray-scale COW MRA in several arterial trees with discrimination of vessels by the total number of bifurcations and by a minimum branch length. Specifically, the skeletonizations were applied to basilar artery and branches and the two middle cerebral arteries. For each arterial tree in each of three subjects, skeletonization was applied with both five and 10 bifurcations allowed with minimum branch lengths of 15 and 25 voxel connectivity distance units (the length of the branch is considered as the number of voxels within it as an approximation). One seed point was specified at a proximal location on the vascular tree being skeletonized along with the nulling of a rectangular region immediately upstream of the seed point to prevent undesired skeletonization of the vessel in the upstream direction. The testing of the algorithm as reported in Table 2 was performed on the full images but the speed of the algorithm is more accurately reflected in the application to a smaller cropped portion of the image where non-optimized tasks such as initialization are less significant; increase in the size of the image has essentially no effect on the speed of the core elements of this algorithm. In a 100×200×100 region of the COW image which encompasses all visible vessels downstream of the MCA, the entire skeletonization requires less than 5 seconds on the MIPS 10000 195 MHz processor.

Performance of the skeletonization was conducted on three MRA's which are normal in the region of interest which each included two middle cerebral artery (MCA) trees and one basilar artery (BA) tree. Skeletonization was performed on each vascular tree using the same combinations of the number of bifurcations (five and 10) and minimum branch length (15 and 25 voxel units) across the three MRA's primarily to allow for comparability and pooling of the results amongst the three images. The capability of obtaining a "standardized" skeletonization of a given cerebral MRA is itself of potential value, although the ability to distinguish variability in image quality from variability in vascular structure and function is unknown at this point. Small variation in the seed point placement generally only produces variation in the skeletonization in the immediate vicinity of the seed point because the underlying ORG connectivity and directionality is relatively unchanged by small changes in the seed point location.

Thus, the skeletonization was rated simply according to the correctness of its connectivity. The detection or discrimination problem is not addressed by the trimming method and was not under consideration in this study; the vessels were effectively segmented by region growing which in this study was done conservatively such that nearly all overgrown regions would be part of the vasculature. Determination of the correctness of the skeletons was done by visual inspection of the MIP image using limited slice ranges ("Subvolume MIPS") and isosurface visualizations. In the evaluation of the skeletonization, each segment of the vascular tree arising from a bifurcation (ten segments for case of five bifurcations, 20 segments for case of ten bifurcations) was rated as either correct or incorrect. Segments that did not belong to true vessels or were incorrectly connected at their downstream origin were considered as errors.

The results of this study for the basic form of the skeletonization by trimming are shown in Table 2 and a sample skeletonization is displayed in FIG. 5 for the middle cerebral artery under the processing specifications of 10 bifurcations and the branch length of 15 voxel units. One error in all of the skeletonizations was due to a leakage of the skeleton into a non-vascular region, all other errors were due to incorrect connectivities due to the incorrect joining of vessels in close proximity to one another. Such errors, if occurring under a lower specified number of bifurcation will necessarily occur at higher number of bifurcations. Thus, it is seen from the table that almost all such errors occur amongst the segments from the earlier bifurcations or amongst the largest vessels. A greater number of such errors occur in the arteries descended from the middle cerebral arteries where there is a greater apparent density of vessels than in the vascular tree originating from the basilar artery.

Overall, the skeletons produced by the trimming process were largely accurate in their connectivity especially in the less dense basilar artery trees where less than one connectivity error, on average occurred. A higher rate of about three errors per tree did occur in the MCA arterial trees. These errors could almost entirely be attributed to a high degree of overlap of intensities of the larger vessels passing nearby to one another. However, because such errors occur in relative isolation to one another, more sophisticated methods have largely been able to correct these errors as will be discussed in the following sections.

TABLE 2

| Study Conditions | Number of Samples | Connectivity Errors (average) |
|---|---|---|
| MCA (5, 15) | 6 | 2.3 ± 1.5 |
| MCA (10, 15) | 6 | 3.0 ± 1.7 |
| MCA (5, 25) | 6 | 2.1 ± 1.5 |
| MCA (10, 25) | 6 | 3.5 ± 1.4 |
| basilar (5, 15) | 3 | 0.0 ± 0.0 |
| basilar (10, 15) | 3 | 1.0 ± 1.7 |
| basilar (5, 25) | 3 | 0.0 ± 0.0 |
| basilar (10, 25) | 3 | 2.0 ± 1.7 |

Algorithm applied to middle cerebral arteries (MCA) and basilar artery in three MRA's. Numbers in parenthesis in "study condition" column refer to specified number of bifurcations and minimum branch length (in voxel units) respectively. The samples were taken from three subjects with two MCA and one basilar artery trees from each subject.

Modification of the ORG Algorithm

Figure 6:
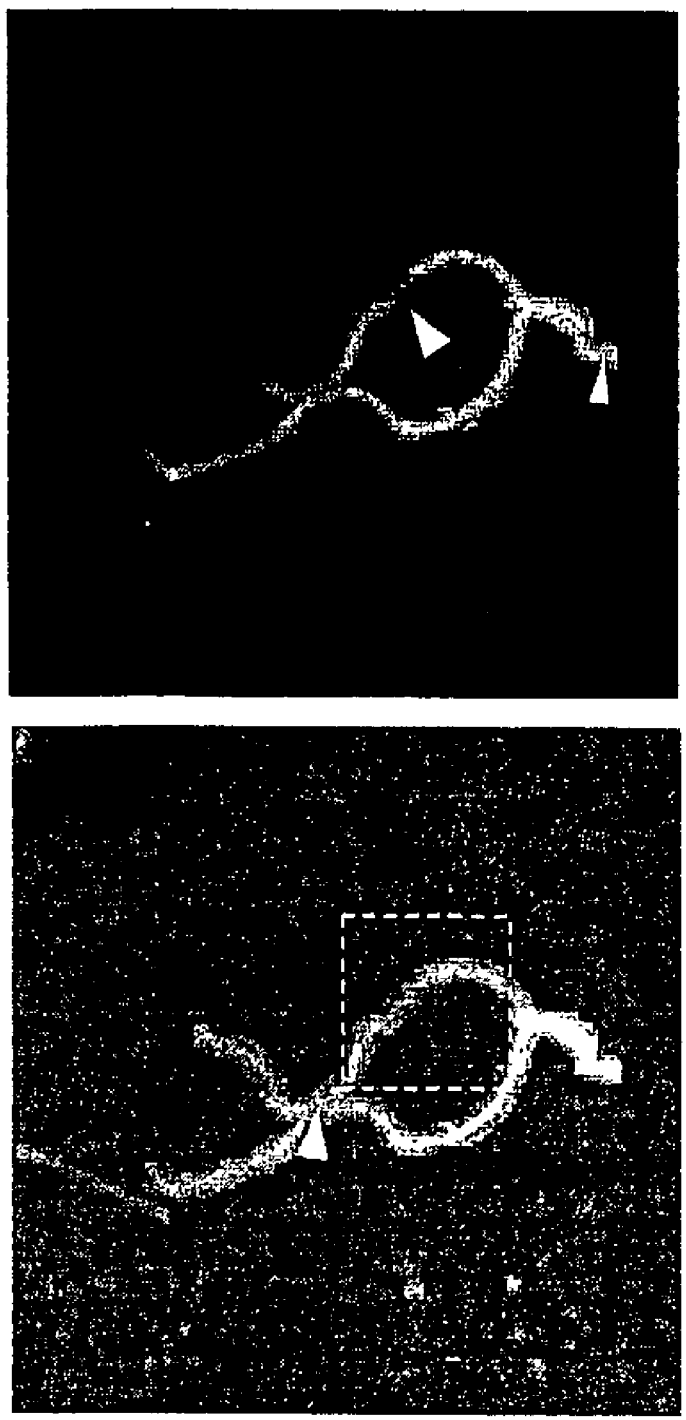
FIG. 6 shows with several angiograms the effect of vessel overlap on the basic method.

Generally, the constraint that connectivities amongst points in the image be purely branching or acyclic in nature is suitable to the analysis of the centerline of the vasculature; ideally those centerlines are just a subset of the total connectivity tree which can be identified by explicit selection of endpoints on the vascular tree or by a trimming process, as described above. However, this topological constraint may in some cases be too inflexible. This has been found to be the case where the density of vessels is very high and vessels appear to intersect to form apparent loops in the vasculature as tends to occur in the COW MRA (in addition to the real anatomical loops of the vasculature in that region). In these types of situations, the ORG method may establish incorrect connectivity between the distinct intersecting vessels, which leads to the incorrect directionality of the graph beyond that point and which necessitates the disjoining of a true vessel segment because of the strictly acyclic nature of the ORG graph. This problem is illustrated in FIG. 6. Under such conditions it is reasonable to relax the acyclic constraint on the ORG topology so as to permit a limited number of cycles in the connectivity graph. A framework and specific methods for doing so will be discussed below and in the following sections. The resulting modified ORG algorithm, when applied to images of dense vasculature, will then be shown to be an adequate basis for the skeletonization.

A reasonable criteria for allowing a limited number of cycles into the connectivity graph is to limit the size of the cycles or, in other words, specify that any cycle in the connectivity graph must have a length greater than or equal to some given minimum size. Applied to the ORG, the growth process would then proceed as before, but in addition to growing into areas outside the growth region which correspond to establishing acyclic connectivity, growth is also permitted onto previously grown points, provided that the size of the cycle formed is greater than some minimum size. Implementation of a method with approximately this behavior is described in the following section.

At points where paths along vessel segments are disjoined in the ORG graph, continuity along the vessel is usually obvious at the local level and clearly a greatest-minimum path and if only the local region were considered, the ORG would join points to either side of the discontinuity. This is essentially the basis of the modified ORG method. While the modified method is not a technique for explicitly extending the graph, it does tend to "rejoin" such breaks within vessels in such a way as is consistent with a local application of the method. This is qualitatively based on the observation that paths produced by an ORG method along a ridge in the intensity structure will be nearly equivalent to the path of an ORG graph from two opposing origins on that intensity ridge which includes their first collision point.

Characterization of the growth pattern associated with a "break point" corresponds to that of two opposing ORG growths if only the local region is considered, such as in FIG. 6. A two-dimensional test image on the left simulates the effect of distinct vessels appearing to overlap one another due to their close proximity (arrowhead at left). The right image shows the region overgrown by the ORG method (originated at small arrowhead) at one given point in the process. In this example, the ORG method incorrectly connects the vessels at the overlap point and breaks the connectivity within a vessel (large arrowhead on right). However, these break points are usually relatively obvious and can be mended as described hereafter. Note also that within a subregion of the image (dotted square on right) the ORG method produces the correct connectivity along the vessel.

One problem with the above-modified ORG algorithm is that, once cycles have been introduced into the graph, directionality within the graph becomes ambiguous. As such, identification of paths between a given pair of points requires traversing of the graph in a multitude of directions significantly complicating the computation.

However, while the graph is cyclic in nature, within a given region of the image and the corresponding graph a given pair of points will probably not be part of more than one cycle. Thus, the cycle size determination can be made assuming there is only one path between a given pair of points which can be determined by traversing the graph in an upstream direction.

The modification to the connectivity of the basic ORG method (from equation 2) is described below. Basically, a set of new edges, E', is added to the set of edges E of the basic ORG. The qualifications for the edges in E' are described in (9a). Essentially, any cycle in the ORG graph must have a size greater than some minimum value, $CS_{min}$. Furthermore, to enforce the assumption that cycles in the graph occur in relative isolation from one another, all the cyclic edges in E' are required to be a distance of $CS_{min}$ from one another.

Let $a\text{-}s_n$ be an edge which connects the growth point $s_n$ at any iteration to one of its neighbors, a, which is already in the grown region R, $(a \in \text{Neighbor}(s_n) \backslash G_n)$ ($G_n$ defined in (1b)). Let $CS_n: Z^N \to Z$ be a function which determines, for any given edge added to the ORG connectivity at a given iteration, what the size of the minimum-sized cycle it is associated with. "Arbitrary" is a function that arbitrarily chooses one element of a set that in this case is determined by the scan order at each iteration.

$$E_{pot,n} = \{a\text{-}s_n | CS_n(a\text{-}s_n) > CS_{min}\} \cap \{a\text{-}s_n | \forall e' \in E'_n, D(e', a\text{-}s_n) > CS_{min}\} \quad (9a)$$

$$E'_{n+1} = E'_n \cup \{\text{Arbitrary}(E_{pot,n}) | E_{pot,n} \neq \emptyset\} \quad (9b)$$

$$E_{n+1} = E_n \cup \{g\text{-}s_n | g \in G_n\} \cup E'_{n+1} \quad (9c)$$

In summary, the method of graph generation may be modified to handle circumstances where vessels overlap. In this case new region boundary points around the second and subsequent growth points are identified, wherein the new region boundary points are additional region boundary points or present region boundary points whose distance within the graph from the present growth point is at least a certain number of points. This introduces cycles into the graph, which are removed in the modified skeletonization method, as described below.

Modified Skeletonization by Trimming

Figure 7:
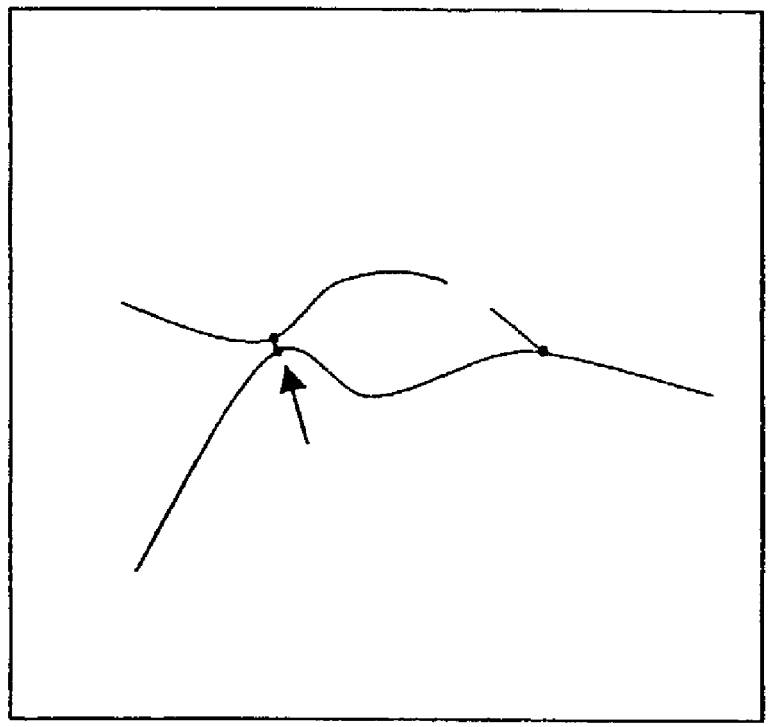
FIG. 7 illustrates a problem that can occur in certain applications of the basic method.
Figure 7:
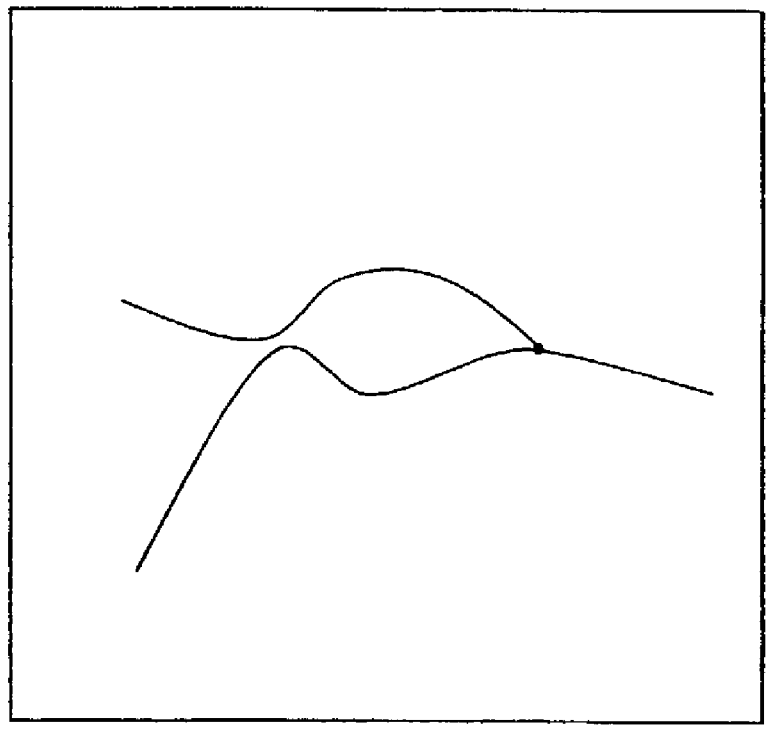

The results of the basic skeletonization by trimming method, described above, can be improved using the modified ORG method such that the connectivity and directionality of the skeletonization is quite reliable. The method for extending the skeletonization by trimming is heuristic and is based on the observation that, within the higher-order branchings of the vasculature, bifurcations do not occur in close proximity to one another and even in so-called trifurcations such as in the popliteal artery, there is substantial separation between two distinct bifurcations. This observation is significant in the context of skeletonization because just such a formation tends to be produced when two distinct vessels nearly intersect and are incorrectly joined in the skeleton. This situation is illustrated in FIG. 7. The left image has two vessels that nearly intersect. Skeletonization based on the basic ORG method may incorrectly connect the two vessels at that point. Rather than producing the correct connections of the vessel, a trifurcation-like structure may be formed in the skeleton consisting of two nearby bifurcations (two dark dots indicated by the arrow in the right image).

A modified trimming method seeks to remove or minimize trifurcation-like formations in the skeletonization by taking advantage of the alternative connectivity or edges of the modified ORG graph. More specifically, a skeletonization by trimming is carried out as described above without regard for edges specific to the modified ORG graph. Then, essentially, a variety of alternative acyclic skeletonizations are formed by the inclusion of one or more of the cyclic edges produced by the modified ORG and a corresponding removal of one of the original edges. For each of these alternative skeletonizations, the one in which all the bifurcations have the greatest degree of separation from one another is preferred.

Stepwise, the algorithm proceeds as follows:

TABLE 3

1. Apply modified ORG algorithm.
2. Determine the basic skeletonization by trimming.
3. Determine if the basic skeletonization by trimming can be improved, in terms of reducing any "trifucations", by the inclusion of one or more of the "reconnection" edges from the modified ORG graph. For each "reconnection" edge:
   a. Add points to basic skeleton to complete the cycle associated with the reconnection edge. For purposes of evaluating trifurcations, trim off any trivial branches produced by this step (less than 5 voxel units long).

TABLE 3-continued b. Determine the most likely trifurcation point within the cycle (where the skeleton literally divides in three or where there are two bifurcations in close succession). Then, remove the trifurcation: If the trifurcation is composed of two bifurcations which are both within the cycle, simply remove the segment of the skeleton between the two bifurcations so as to obtain an acyclic skeleton. Otherwise, consider the trifurcation to be detected-but-not-corrected. In that case, arbitrarily remove an edge in the skeleton adjacent to the trifurcation which is within the cycle so as to obtain an acyclic skeleton.

Performance of the algorithm in Table 3 was evaluated and compared with that of the algorithm in Table 1. For these tests, a slight difference in the implementation of the modified ORG method that described in (9) was used in which the distance between any two cyclic edges in E' was considered to be the maximum of the distance from either of the two points to their mutual bifurcation point in the ORG graph as opposed to the sum of the distance from each of the two points to their mutual bifurcation point. The cycle size, CS, was determined in a similar way. This difference in implementation is unlikely to produce results significantly different from those that would be produced by a direct implementation of the algorithm described by (9). For these tests, the minimum cycle size, $CS_{min}$ was set to be the same as that of the minimum branch length.

The results were assessed only in the MCA artery region where there were a sizeable number connectivity and directionality errors in trimming of the basic ORG graph. Table 4 is a comparison of the modified Skeletonization by trimming algorithm with the basic skeletonization by trimming algorithm (Table 2). Table 5 shows that the net result of the modified skeletonization by trimming was that less than one connectivity error occurred within the vessels skeletonized under all conditions. The complete computation of the skeleton, after the interactive initialization of the algorithm, took less than 10 seconds on 100×200×100 region.

TABLE 4

| Study Conditions | Number of Samples | Added Connections (average) | Correctly Added Connections (average) | Remaining Missing Connections (average) |
|---|---|---|---|---|
| MCA (5, 15) | 6 | 1.0 ± 0.6 | 0.5 ± 0.5 | 0.3 ± 0.8 |
| MCA (10, 15) | 6 | 3.2 ± 1.6 | 1.0 ± 0.8 | 0.2 ± 0.4 |
| MCA (5, 25) | 6 | 1.5 ± 0.5 | 0.8 ± 0.7 | 0.2 ± 0.4 |
| MCA (10, 25) | 6 | 3.5 ± 1.0 | 1.2 ± 0.9 | 0.2 ± 0.4 |

TABLE 5

| Study Conditions | Number of Samples | Undetected Connectivity Errors (average) | Detected but Uncorrected Errors (average) |
|---|---|---|---|
| MCA (5, 15) | 6 | 0.8 ± 1.2 | 0.2 ± 0.2 |
| MCA (10, 15) | 6 | 0.3 ± 0.8 | 0.2 ± 0.2 |
| MCA (5, 25) | 6 | 0.7 ± 1.1 | 0.3 ± 0.3 |
| MCA (10, 25) | 6 | 0.7 ± 1.1 | 0.2 ± 0.2 |

Artery-Artery Separation

Figure 8:
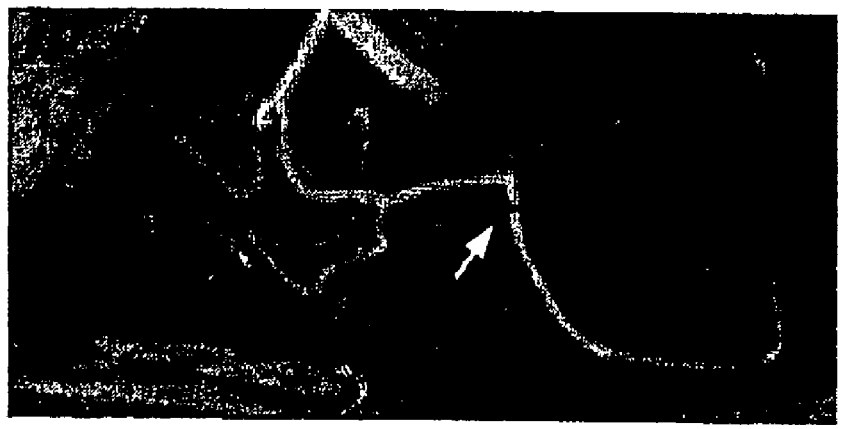
FIG. 8 shows the enhancement of an angiogram in accordance with a modified method that solves the problem noted in FIG. 7.
Figure 8:

The high density and overlapping nature of the cerebral vascular tree makes visualization of individual vessels in MIP projections difficult, particularly when vessels are highly enhanced by high flow rates even with careful selection of the MIP orientation and slice range. This problem has been addressed by the application of shaded surface display to provide depth information and by a method whereby both the surface and medial axes are detected allowing for selective colorization. In a likewise, but more powerful way, the cerebral skeletonization can be used to improve the quality of the visualization. The method suggested here is to effectively disentangle or separate the arterial sub-trees. Given that centerlines of vessels can be identified reliably by the methods described in the previous sections specific vascular sub-trees can easily be identified, based on, for example, the specification of the origin a particular vessel. Points nearby to the skeleton downstream of the indicated point are set to zero intensity, Specifically, good results have been found zeroing out points within two 26-neighbor dilation iterations of the downstream skeleton. The result of the application to the a cerebral vascular tree is shown in FIG. 8. The portion of the vascular tree downstream of a given point on the vascular tree (arrow on left image) is nulled according to the connectivity of the modified ORG skeletonization within two iterations of a 27-neighbor dilations. Note a small section of an artery has been unintentionally nulled (arrow in right image) due to the close proximity of distinct vessels. This method is useful for obtaining an unobstructed view of individual vessels in the cerebral MRA.

Once the desired skeleton of the vascular tree has been produced, this disentangling procedure can be conducted in a very interactive manner. The non-optimized speed is less than five seconds on a 100×200×100-cropped region.

The invention addresses the problems of visualization and characterization of small vessels in MRA which are inadequately resolved by other methods. These problems include that of detection of the paths of smaller vessels under conditions where regional or intensity-based segmentation methods are inadequate in the abdominal MRA and the problem of determination of the proper connectivity or anatomical relations of the vessels such as in the cerebral MRA. Like several other methods, these problems are addressed within the framework of gray-scale operations, but the novel principles of ORG connectivity applied to this problem incorporates global gray-scale intensity properties and topological constraints into the formation of the centerlines both of which are absent from previous methods. Specifically, paths are formed according to the greatest-minima property such that they follow the center of the vessels, to within the resolution of the image grid, provided that the image intensity of the vessels peak towards their center, which is typical for smaller vessels in MRA.

In implementation, the methods are practical and fast. All the methods are interactive in nature but small-scale variations in user input have relatively minor effect on the resulting path determinations. Methods presented for the detection of vessels using ORG connectivity in the abdominal MRA or in the smaller vessels of the cerebral MRA are the most intensely interactive requiring the specification of all distal endpoints. Improvement in the automation of this method within the context of the ORG is entirely possible. The paths may be incorporated into improved methods for determination of vessel diameter.

Having illustrated and described the principles of the invention in an exemplary embodiment, it should be apparent to those skilled in the art that the illustrative embodiment can be modified in arrangement and detail without departing from such principles. For example. many of the software aspects of the embodiment may be implemented in hardware and many of the hardware aspects may be implemented in software. In view of the many possible embodiments to which the principles of the invention may be applied, it should be understood that the illustrative embodiment is intended to teach these principles and is not intended to be a limitation on the scope of the invention defined in the following claims. I therefore claim as our invention all that comes within the scope and spirit of these claims and their equivalents.

I claim:

1. A computer-implemented method of generating a graphic representation of an angiogram, the method comprising:
   a. obtaining a digital image of the angiogram;
   b. recognizing a first growth point within the image;
   c. identifying region boundary points around the first growth point;
   d. connecting the region boundary points to the first growth point, thereby creating edges of a graph;
   e. selecting the region boundary point with the greatest intensity as a second growth point;
   f. identifying additional region boundary points around the second growth point;
   g. connecting the additional region boundary points to the second growth point, thereby growing the graph;
   h. selecting the region boundary point with the greatest intensity in the image as a third growth point; and
   i. repeating steps f through h with the third and subsequently identified growth points.

2. The method of claim 1 wherein steps f through h are repeated until each point in the digital image is connected to another point in the graph.

3. The method of claim 1 including recognizing multiple first growth points.

4. The method of claim 1 wherein the first growth point is a seed point provided by a user.

5. The method of claim 1 wherein the digital image is three dimensional and identifying region boundary point comprises identifying a set of adjacent points in three dimensions.

6. The method of claim 1 wherein the points in the image correspond to pixels or voxels.

7. The method of claim 1 wherein the angiogram is obtained from magnetic resonance angiography.

8. The method of claim 1 wherein the angiogram is obtained from computed tomography angiography.

9. The method of claim 1 wherein the angiogram is obtained from x-ray angiography.

10. A method in accordance with claim 1 for delineating vessels within an angiogram, the method including:
    recognizing a point in the graph as an endpoint of a vessel; and
    defining a path between the endpoint and the first growth point through connected points.

11. The method of claim 10 wherein the recognizing step comprises recognizing a user-specified end point.

12. The method of claim 10 wherein the recognizing step comprises:
    discarding branches in the graph of a fewer than a certain number of connected points; and
    recognizing the last point in a remaining branch as an endpoint of a vessel.

13. The method of claim 10 wherein the defining step comprises superimposing the path on a maximum intensity projection of the angiogram.

14. The method of claim 10 wherein the defining step comprises generating a three-dimensional display of the path.

15. A computer-readable medium on which is stored computer instructions for performing the steps of claim 1.

16. An apparatus for generating a graphic representation of an angiogram, comprising:
    means for obtaining a digital image of the angiogram; and
    means for:
       recognizing a first growth point within the image;
       identifying region boundary points around the first growth point;
       connecting the region boundary points to the first growth point, thereby creating edges of a graph;
       selecting the region boundary point with the greatest intensity as a second growth point;
       identifying additional region boundary points around the second growth point;
       connecting the additional region boundary points to the second growth point, thereby growing the graph; and
       selecting the region boundary point with the greatest intensity in the image as a third growth point.

17. A computer-implemented method of generating a graphic representation of an angiogram, the method comprising:
    a. obtaining a digital image of the angiogram;
    b. recognizing a first growth point within the image;
    c. identifying region boundary points around the first growth point;
    d. connecting the region boundary points to the first growth point, thereby creating edges of a graph;
    e. selecting the region boundary point with the greatest intensity as a second growth point;
    f. identifying new region boundary points around the second growth point, wherein the new region boundary points are additional region boundary points or present region boundary points whose distance within the graph from the present growth point is at least a certain number of points;
    g. connecting the new region boundary points to the second growth point. thereby growing the graph;
    h. selecting the region boundary point with the greatest intensity in the image as a third growth point; and
    i. repeating steps f through h with the third and subsequently identified growth points.

18. A method in accordance with claim 17 for delineating vessels within an angiogram, the method including:
    discarding branches in the graph of a fewer than a certain number of connected points;
    identifying cycles in the graph;
    breaking each cycle in the graph;
    recognizing the last point in a remaining branch as an endpoint of a vessel; and
    defining a path between the endpoint and the first growth point through connected points.

19. The method of claim 18 wherein the defining step comprises superimposing the path on a maximum intensity projection of the angiogram.

20. A computer-readable medium on which is stored computer instructions for performing the steps of claim 18.

* * * * *